United States Patent Office 2,933,471
Patented Apr. 19, 1960

2,933,471
EPOXIDE ACIDS

Sylvan O. Greenlee, Racine, Wis., assignor to S. C. Johnson & Son, Inc., Racine, Wis.

No Drawing. Application June 4, 1956
Serial No. 588,958

9 Claims. (Cl. 260—47)

This invention relates to new resinous epoxide compositions and products, the epoxide compositions containing within each molecule unreacted epoxide groups and carboxyl groups. The compositions, which are soluble and fusible, may be self converted by the application of heat, or admixed with other compositions and then converted by the application of heat, to form infusible, insoluble products valuable in the manufacture of films, coating compositions, adhesives, molded articles, etc. The invention includes the new epoxide compositions, as well as the method of preparing the same and the final reaction products derived therefrom.

An object of the invention is the production of new epoxide compositions which are valuable alone, or in combination with other materials, in the preparation of films, coating materials, adhesives, resins, etc.

Another object of the invention is the production of new epoxide compositions containing chemically bound therein unreacted epoxide groups and carboxyl groups capable of further reaction to form polymeric products.

Another object of this invention is the production of complex reaction products from epoxide compositions of the hereinbefore described character characterized by hardness, flexibility and chemical resistance.

And still another object of this invention is to provide a novel process for the production of the epoxide compositions of this invention.

These and other objects and advantages are attained by the present invention, various novel features of which will become more fully apparent from the following more detailed description, with particular reference to specific examples which are to be considered as illustrative only.

In general, the epoxide compositions of this invention are prepared by reacting polyepoxide materials with diaryloxy acids under conditions whereby the aryl hydroxyl groups of the acids will react with the epoxide groups of the polyepoxides to form ether linkages and alcoholic hydroxyl groups, the carboxyl groups of the acids being first converted to a carboxylate group so as to prevent their reaction with epoxide groups during the preparation of the epoxide compositions. If the reaction is carried out using a mixture containing an excess of aryl hydroxyl groups over epoxide groups, the reaction is terminated prior to complete reaction of all the hydroxyl groups. If an excess of epoxide groups over aryl hydroxyl groups is present, however, the reaction may be carried out so that the aryl hydroxyl groups are substantially all reacted. Products formed will thus have epoxide groups as well as carboxylate groups, and these products may then be reacted with an acid with regeneration of carboxyl groups.

The preparation of the compositions of this invention may be illustrated by the following reaction of the diepoxide, 1,2-epoxy, 3,4-epoxybutane, with the monosodium salt of 4,4-bis(4-hydroxyphenyl) pentanoic acid, and the acidification of the carboxylate intermediate to form the acid epoxide. In the reaction illustrated, an excess of diepoxide is used, so that if the polymerization is carried to completion, the product obtained will contain terminal epoxide groups.

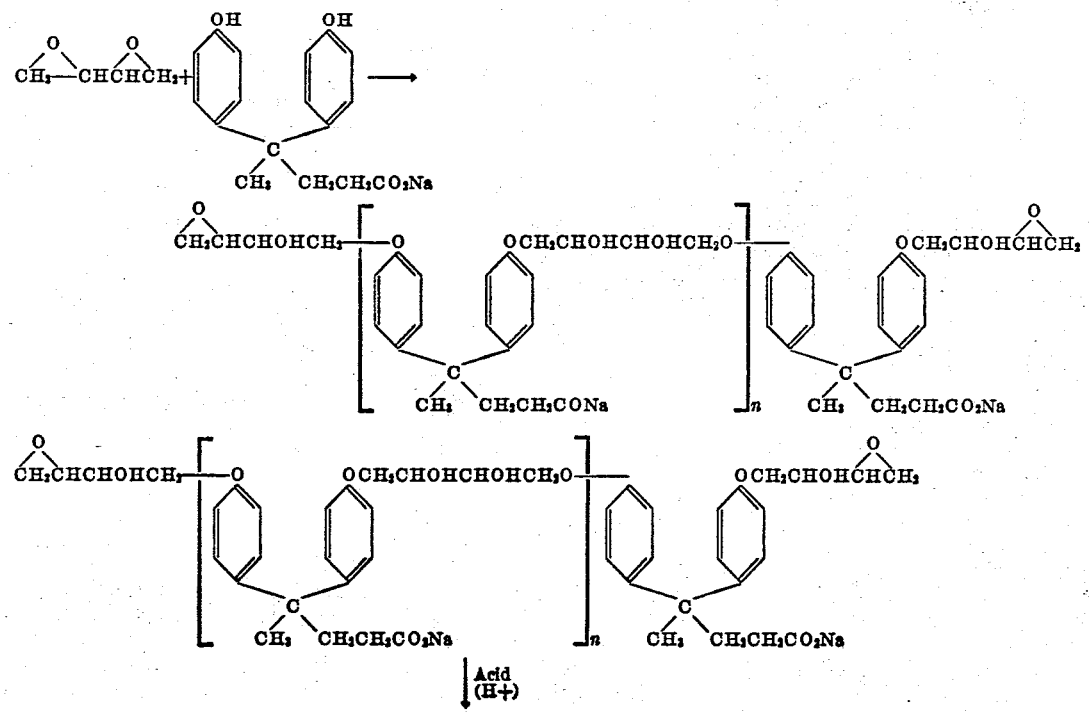

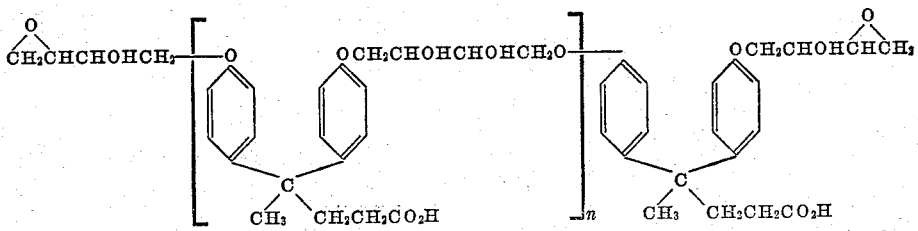

In the above, n indicates the degree of polymerization which has occurred in the formation of the epoxide resin. As can be seen from the above, the primary reaction involved in the preparation of the resinous carboxylate intermediate appears to be one in which the aryl hydroxyl groups react with the epoxide groups to form ether linkages and alcoholic hydroxyl groups. Epoxide groups it is known will react with a number of compounds containing active hydrogen, i.e., hydrogens attached to oxygen, nitrogen, or sulfur atoms, and in the preparation illustrated above there probably occurs some reaction of epoxide groups with the alcoholic hydroxyl groups formed in the splitting of epoxide groups particularly in the later stages of reaction. However, it is known that aryl hydroxyl groups are considerably more reactive with epoxide groups than alcoholic hydroxyl groups, so that the coupling action illustrated above proceeds readily without appreciable interference by the alcoholic hydroxyl groups. The intermediate carboxylate derivative may then be treated with acid to yield a resinous epoxide containing epoxide and carboxyl groups.

The resinous epoxides of this invention containing within the same molecule both epoxide groups and carboxyl groups, are extremely valuable in the preparation of a wide variety of products. It has been the practice in the conversion of epoxide compositions to complex products to add to the epoxide compositions converting agents, such as acids or amides, so that conversion will be brought about more readily, and to obtain more completely converted polymeric products. Carboxyl groups, and amine groups, contain active hydrogens which apparently are considerably more reactive with epoxide groups than are the hydrogens of alcoholic hydroxyl groups. These groups also tend to have a catalytic effect, carboxyl groups, for instance, tending to promote the self polymerization of epoxide groups and the reaction of other active hydrogen-containing materials with epoxide groups. The epoxide compositions of this invention may be converted directly without the addition of a converting agent since relatively reactive active hydrogen-containing carboxyl groups are already present in the epoxide composition. The compositions therefore are extremely convenient to use in the preparation of such articles as protective coatings and molded articles as mixtures may be prepared which need only be heated to convert them to polymeric form.

The conversion to polymeric products of these epoxide compositions is primarily through reaction of epoxide groups so that there are no by-products formed in the reaction. The conversion of the epoxide compositions may thus be carried directly to completion, or stopped at any intermediate stage and then carried to completion, making them highly valuable to a product formulator in obtaining a desired composition. If desired, of course, the compositions of this invention may be compounded with other active hydrogen-containing compounds such as amides, amines, acids, and thiols, in which case heat conversion is accompanied by interreaction of the epoxide groups with the modifying materials employed.

In general, in the reaction of a polyepoxide with the carboxylate derivative of a diaryloxy substituted acid, care must be exercised to prevent destruction of epoxide groups through side reactions. Epoxide groups are subject to hydrolysis for example, and reactions involving epoxides should be performed so that loss of epoxide groups through hydrolysis is minimized. The hydrolysis of epoxide groups is particularly marked when an alkali metal salt is present, the salt acting as a catalyst. In the production of polymeric epoxide products from polyepoxides and aryloxy compounds free from active hydrogen-containing groups other than aryl hydroxyl groups, it has been found practicable to carry out the reaction in an aqueous media, as the aryloxy compounds are relatively soluble in water whereas the polymeric epoxide resins produced therefrom are relatively insoluble and therefore quite resistant to hydrolysis. Such a procedure is impractical with the compositions of this invention, however, since the carboxylate derivative of the diaryloxy acids employed yield upon reaction with a polyepoxide, complex carboxylate intermediate resins which are water soluble and therefore subject to hydrolysis, especially at elevated temperatures. It has been discovered that these carboxylate intermediate resins may be prepared quite successfully using organic solvents of high solvency, the starting materials being sufficiently soluble in these solvents to permit the reaction to proceed. Due to the absence of water, however, the polymeric products obtained are unaffected by hydrolysis.

Organic solvents which have been found to be valuable as solvents for the polyepoxide and diaryloxy acid carboxylate derivative may be illustrated by such alcohol, ester, and ketone solvents as dimethyl sulfoxide, dioxane, methyl isobutyl ketone, methyl ethyl ketone, Carbitol, Carbitol ethers, Cellosolve, Cellosolve ethers, benzene, toluene, xylene, ethanol, and butanol. Since the carboxylate derivatives of the diaryloxy acids employed are alkali metal salts of the acid, the solvents should be inert to alkali. For instance, the ester solvents would not be practical. The solvents generally should be able to solubilize polar type materials, and it has been found that those solvents having kauri-butanol solvency of greater than about 85 were the most satisfactory in preparing the compositions of this invention.

In general, the diaryloxy acid carboxylate derivatives employed in this invention are the mono alkali metal salt of the diaryloxy acids, such as the mono sodium, potassium, or lithium salts of the acids. The mono alkali salt of the acids may readily be prepared without affecting the aryl hydroxyl groups of the diaryloxy acids due to the stronger acidity of carboxyl groups as compared to aryl hydroxyl groups. In the preparation of the mono alkali metal salt, the hydroxides, oxides, and carbonates of the alkali metal may be used, the choice of the alkaline material employed depending upon such factors as availability and economy. It has been found that in specific applications there are slight variations in the solubility characteristics and the sensitivity to polymerization displayed by the various alkali metal salts, however, these differences may be adjusted readily by regulating the reaction time, temperature, or solvent used in the preparation of the epoxide resins from the various alkali metal salts.

The reaction of the mono alkali metal salts of the diaryloxy acids with the polyepoxides to form the intermediate carboxylate derivative of the resinous epoxides of this invention may be carried out by heating a mixture of the materials at temperatures ranging from about 50–200° C. At lower temperatures the reaction rate is somewhat slow, and at higher temperatures conversion of the mixtures and loss of epoxide content tends to take place. If desired, the carboxylate derivatives of the diaryloxy acids may be preformed, using aqueous or organic solvent solutions, and after purification mixed for reaction with the polyepoxides; or alternatively, the carboxylate derivatives of the acids may be formed using an organic solvent solution, and the polyepoxide compositions then added directly to the organic mixture.

The intermediate carboxylate derivative, that is, the alkali salts of the resinous epoxides of this invention are quite valuable in a number of reactions. The carboxylate groups may be converted to carboxyl groups to form epoxide compositions containing carboxyl groups valuable in coconversion and self conversion reactions. The alkali salts of the epoxides themselves are valuable for use in the production of polymeric products. For instance, because the materials are alkali salts, they catalyze the reaction of epoxide groups in self polymerization reactions and reactions with active hydrogen-containing groups. Therefore, the alkali salts of the epoxides are advantageously used, for instance, with other epoxide compositions, the salts being chemically carried by reason of their epoxide groups into the final polymeric products while at the same time catalyzing the reactions of epoxide groups.

The carboxylate groups of the intermediate carboxylate derivative of the resinous epoxides may be conveniently converted to carboxyl groups by means of ion exchange with an acid. One method which has been found to be particularly valuable comprises reacting the carboxylate derivative with suitable amounts of dehydrated acid form of cation exchange resin. This particular method has the advantage that anhydrous conditions may be employed preventing hydrolysis of epoxide groups. An aqueous acid solution may also be employed provided care is taken to prevent hydrolysis of epoxide groups. For example, the reaction with the aqueous solution should preferably be carried out at about room temperatures or lower. In aqueous solutions, ion exchange occurs readily using acids having a dissociation constant of greater than about $5 \times 10^{-5}$, the equilibrium with these acids favoring the formation of the acid epoxide. The stronger acids, such as hydrogen chloride, may be used for the ion exchange reaction providing organic solvents are employed so that the destruction of epoxide rings is minimized.

The polyepoxides employed in the preparation of the resinous epoxides of this invention contain two or more epoxide groups per molecule. The simplest polyepoxides may be illustrated by such materials as the four carbon diepoxide, 1,2-epoxy-3, 4-epoxy butane. The epoxy groups may be separated by ether linkages as illustrated by bis(2,3-epoxy propyl) ether, bis(2,3-epoxy 2-methyl propyl) ether, etc.

The polyepoxides may also be of a somewhat more complex character. Illustrative of such epoxide compositions are the polyepoxide polyesters which may be prepared by esterifying tetrahydrophthalic anhydride with glycols, and epoxidizing the products of the esterification reaction. Polyepoxide polyesters of this type as well as their preparation, are more fully described in a copending application having Serial No. 503,323, filed April 22, 1955. By properly proportioning the reactants in the ployester formation, and by regulating the epoxidation reaction, polyepoxides having up to about 12 or more epoxide groups per molecule may be readily prepared. The polyepoxide polyesters will have terminal hydroxyl or carboxyl groups, depending upon whether an excess of glycol or acid was used in the polyester formation. These groups may be neutralized, if desired, by reaction with a monofunctional acid or alcohol, respectively.

Other epoxide compositions which may be used include the complex epoxide resins which are polyether derivatives of polyhydric phenols and such polyfunctional materials as polyhalohydrins, polyepoxides, or epihalohydrins. Reaction products may be prepared which are polymeric polyhydric alcohols having alternating aliphatic chains and aromatic nuclei connected to each other by ether linkages, containing terminal epoxide groups, and are free from functional groups other than epoxide and hydroxyl groups. It should be appreciated that under certain conditions significant amounts of the monomeric product are often present, as illustrated by the formulas below where $n$ equals zero. Preparation of these epoxide materials, as well as some illustrative examples, are described in U.S. Patents 2,456,408, 2,503,726, 2,615,007, 2,615,008, 2,668,805, 2,668,807, and 2,698,315. Well known commercial examples of these resins are the Epon resins marketed by the Shell Chemical Corporation. Illustrative of the preparation of these epoxide resins are the following reactions:

Polyhydric phenol and an epichlorohydrin—

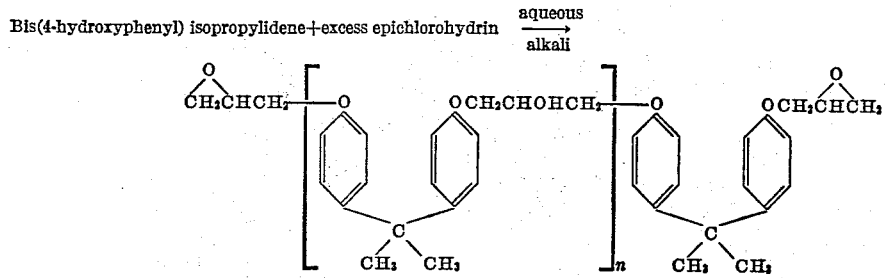

Polyhydric phenol and a polyepoxide—

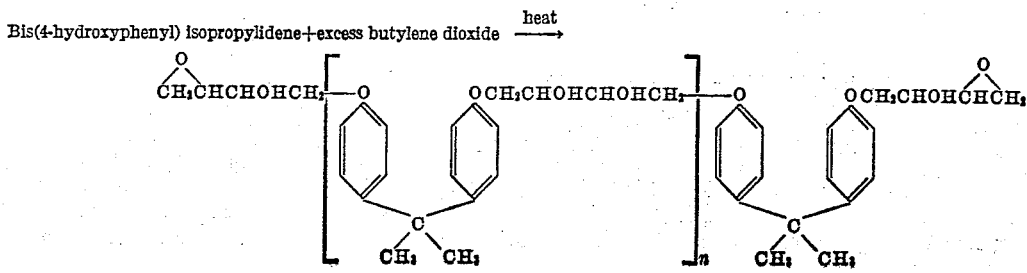

Polyhydric phenol and polyhalohydrin—

Bis(4-hydroxyphenyl) isopropylidene+excess alpha-glycerol dichlorohydrin $\xrightarrow{\text{aqueous alkali}}$

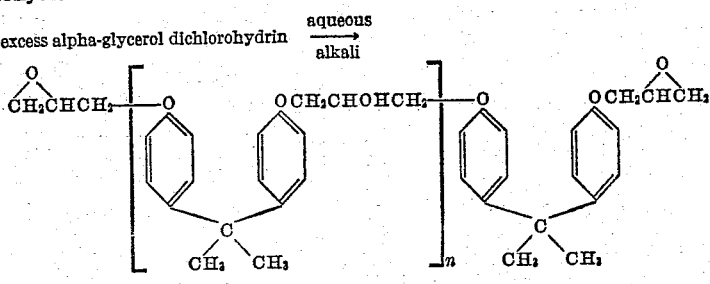

As used in the above formulas, $n$ indicates the degree of polymerization which has occurred in the formation of the epoxide resin. As can be seen from these formulas, the complex epoxide resins may contain terminal epoxide groups, and alcoholic hydroxyl groups attached to the aliphatic portions of the resin and formed by the splitting of epoxide groups in the reaction of these epoxide groups with phenolic hydroxyl groups. Ultimately, the reaction with the phenolic hydroxyl groups of the polyhydric phenols is accomplished by means of epoxide groups, epoxide groups being formed from halohydrins by the loss of hydrogen and halide atoms generally as shown by the following equation:

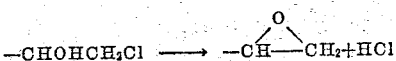

Still other epoxide compositions which may be employed may be illustrated by the aliphatic polyepoxides which are the polymerization products obtained by polymerizing epoxyalkyl alkenyl ethers, such as allyl glycidyl ether, through the unsaturated portions, as illustrated by the following:

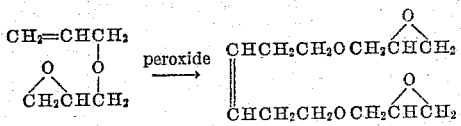

This reaction may be carried further to give higher polymeric products. In polymerization of these ethers, there is probably some polymerization occurring through the epoxide groups, and in addition, some splitting of the epoxide groups to form hydroxyl groups, so that pure compounds are not usually obtained.

Other polyepoxides useful in this invention may be illustrated by the poly(epoxyalkyl)ethers derived from polyhydric alcohols. These materials may in general be prepared by reacting an aliphatic polyhydric alcohol with an epihalohydrin in the presence of a suitable catalyst and in turn dehydrohalogenating the product to produce the epoxide composition. The production of these epoxides may be illustrated by the reaction of glycerol with epichlorohydrin in the presence of boron trifluoride followed by dehydrohalogenation by reaction with sodium aluminate as follows:

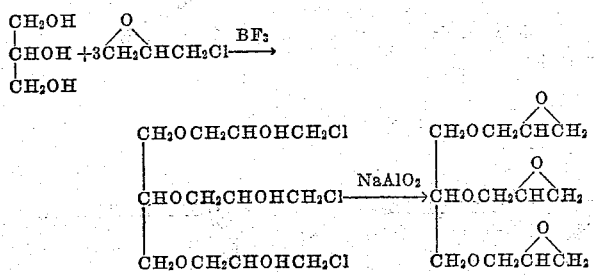

It is to be understood that such reactions do not give pure compounds, and that the halohydrins formed and the epoxides derived therefrom are of somewhat varied character depending upon the proportions of reactants, conditions of reaction, etc. In addition to epoxide groups, the epoxide compositions are characterized by the presence of hydroxyl groups and halogens. Apparently dehydrohalogenation affects only those halogens which are attached to a carbon atom adjacent to a carbinol group. Those halogens remaining in the final product are not removed in the dehydrohalogenation since the proximate carbinol groups may have been destroyed by reaction with an epoxide group, and they are relatively unactive. The preparation of a large number of these mixed polyepoxides are described in Zech, U.S. 2,538,072 and Zech, U.S. 2,581,464.

Other polyepoxide compositions which may be employed herein include the polyepoxides which may be prepared by epoxidizing the esters of unsaturated acids, typified by the esters of natural oil acids. The natural oils, including animal, vegetable, and fish oils, are generally esters of unsaturated aliphatic acids of from about 15 to 22 or more carbon atoms, some of them containing hydroxyl groups in addition to unsaturated portions. Illustrative of such natural oils are soyabean oil, corn oil, cottonseed oil, sardine oil, menhaden oil, etc. The unsaturated acid esters may be esters of monohydric alcohols, or of polyhydric alcohols such as glycerol, pentaerythritol, or resinous polyhydric alcohols. The unsaturated acid esters may also be mixed esters of polyhydric alcohols and polybasic acids, such as the alkyd resins. Upon epoxidation these acid esters may be prepared containing up to 5 or more epoxide groups per molecule. Still other polyepoxide compositions which may be used in this invention may be illustrated by the epoxidation products of polymeric olefins. For example, polybutadiene, obtained by polymerizing butadiene, may be epoxidized conveniently to yield a material having a plurality of epoxide groups per molecule.

The polyepoxides employed may contain small amounts of admixed monoepoxides, and to the extent they are present, they will react with the aryl hydroxyl groups of the diaryloxy acids to form terminal groups or residues. The presence of small amounts of these materials will not interfere with the production of the composition of this invention and in some instances may be advantageous, provided a sufficient amount of polyepoxide is present to serve as a polyfunctional reactant. Generally the most valuable epoxide resins were obtained from polyepoxide compositions having an average of more than about one epoxide group per molecule.

The polyepoxides in general should be substantially free of active hydrogen-containing groups other than alcoholic hydroxyl groups in order to permit the reaction of the polyepoxide with the diaryloxy acids to proceed regularly. For instance, aryl hydroxyl groups and carboxyl groups would interfere with this reaction provided they were present in sufficient quantity. In those cases where the polyepoxide contains such active hydrogen-containing groups, the groups should first be neutralized prior to the reaction of the polyepoxides with the diaryloxy acids. For instance, a polyepoxide polyester of tetrahydrophthalic acid and glycols containing terminal carboxyl groups may be reacted with a monofunctional alcohol so that the terminal carboxyl groups are esterified.

The diaryloxy acids from which the resinous epoxides of this invention may be prepared may be illustrated by the bis(hydroxyaryl) substituted aliphatic acids conveniently obtained by condensing a keto acid with a phenol. In such a condensation reaction, experience in the preparation of related compounds indicates that the carbonyl group of the keto acid should be positioned next to a terminal carbon atom in order to obtain satisfactory yields. As used herein, a terminal carbon atom refers to a primary carbon atom, i.e., one having three hydrogen atoms attached thereto. Prior applications, Serial Nos. 464,607 and 489,300, now abandoned, filed October 25, 1954, and February 18, 1955, respectively, disclose a number of illustrative compounds suitable for use as the diaryloxy acid, and methods of preparing the same. The aryl nuclei of the diaryloxy acids may be alkylated with alkyl groups of from 1 to 5 carbon atoms as disclosed in the above mentioned copending application, Serial No. 489,300, or they may be halogenated. The diaryloxy acids derived from the alkylated phenols, for example, are sometimes desirable since the alkyl groups impart organic solubility to the acids and contribute flexibility characteristics to the products derived therefrom. The unsubstituted acid may, however, be advantageous in that this material is usually more readily purified.

In general, when the diaryloxy acid carboxylate derivative and polyepoxide are reacted with each other so that the reaction is carried substantially to completion, the reactants should be used in such proportions that the number of epoxide groups in the reaction mixture is in excess of the number of aryl hydroxyl groups present, so that the terminal groups of the polymer formed will contain epoxide groups. Epoxide compositions prepared using these proportions were found to be extremely useful, and converted readily to valuable infusible reaction products. The resinous epoxides derived from reaction mixtures wherein the ratio of epoxide groups to aryl hydroxyl groups present was 1.5 or greater are particularly valuable, since such mixtures tend to yield resinous epoxide products wherein the epoxide content is equal to or greater than the carboxyl content, such mixtures upon further reaction tending to be free from unreacted carboxyl groups. In preparing the compositions of this invention, the reaction of the diaryloxy acid carboxylate derivative with the polyepoxide need not be carried to completion, so that reaction mixtures may be employed wherein the aryl hydroxyl content of the mixture is equal to or greater than the epoxide content. For instance, valuable resinous epoxides may be prepared from reaction mixtures wherein the aryl hydroxyl content ranges up to about two times the epoxide content.

The diaryloxy acids used herein contain two aryl hydroxyl groups, so that a maximum number of two mols of polyepoxide will react with each mol of diaryloxy acid carboxylate if only the aryl hydroxyl groups are utilized for reaction. However, any alcoholic hydroxyl groups present react to a certain extent, and there is also present some interreaction of epoxide groups between themselves. In addition, unreacted polyepoxide may be carried by the polymeric product. Mol ratios of greater than two to one may be used, therefore, depending upon the epoxide content of the polyepoxide employed. Useful resinous epoxides may be obtained, for instance, from mixtures wherein the epoxide content ranged up to about 5 times the aryl hydroxyl content in the mixture.

The resinous epoxides of this invention which were found to be most valuable generally contained a ratio of epoxide groups to carboxyl groups ranging from about 8 to 1, to about 1 to 4. Compositions outside of this range are also valuable, however, it may be necessary to incorporate with the resins additional polyepoxide or perhaps a catalyst in order to obtain satisfactory conversion products. As mentioned previously, carboxyl groups, in addition to being quite reactive, have a catalytic effect in the reaction of epoxide groups between themselves and with other active hydrogen-containing groups, so that valuable, self converting resins were prepared which contained appreciable excess of epoxide groups to carboxyl groups. When the ratio of carboxyl groups to epoxide groups in the resinous epoxides was more than about 4 to 1, the converted products prepared from the resinous epoxides tended to display such characteristics as decreased resistance to alkali due to the unreacted carboxyl groups in the polymeric products.

The carboxyl containing resinous epoxides of this invention are fusible, and soluble in lacquer type solvents, including such ether, ester, and ketone solvents as dioxane, butyl acetate, amyl acetate, methyl isobutyl ketone, methyl ethyl ketone, dimethyl sulfoxide. Upon heating, the resinous epoxides are readily converted to higher melting intermediates or to insoluble, infusible products. In addition to reaction of epoxide groups with carboxyl groups, other active hydrogen-containing groups, and other epoxide groups, the conversion is probably accompanied by other reactions such as esterification of hydroxyl groups by carboxyl groups. The presence of these carboxyl groups and the relative ease with which the epoxide resins are converted thereby are considered one of the outstanding features of the epoxide resins of this invention.

In the conversion of the resinous epoxides of this invention, temperatures ranging from about 100 to 250° C. are advantageously employed. By heating the epoxide resins of this invention at these temperatures, conversion to an infusible, insoluble state may be obtained using heating periods ranging from a few minutes up to about an hour. The curing time will depend upon such factors as the reactivity of the specific resin, and the exact temperatures employed. While conversion of the epoxides is readily brought about without the use of catalysts, catalysts may be added if desired. Catalysts which may be used include Friedel-Crafts type catalysts such as boron trifluoride, mineral acid type catalysts, and alkaline salts such as the sodium salt of alcohols. Since boron trifluoride has been found to be quite active in promoting these reactions, latent type boron trifluoride catalysts are usually used, this type of catalyst liberating boron trifluoride upon the application of heat.

The epoxides of this invention may be used with or without modification by other chemicals, plasticizers, fillers, pigments, etc. Some products, for example, which tend to be brittle on conversion are conveniently mixed with plasticizers such as the polyester type plasticizers. Depending upon the end products desired, the epoxide resins may be modified by compounding them with active hydrogen-containing materials, such as polyamides, polyhydric phenols, polyamines, thiols, and the condensates of formaldehyde with certain phenols or the condensates of formaldehyde with ammonia derivatives such as melamine, urea, or thiourea. Conversion of these mixtures result in interreaction of the active hydrogen-containing compounds with the epoxide resins to form valuable complex reaction products.

The epoxide resins may be used with or without solvents depending upon the particular application. In the preparation of protective coating films, it is usually convenient to use a solvent in order to obtain the desired viscosity for final application. In the preparation of molded articles, and in certain adhesive applications, ordinarily a solvent need not be used.

The polymeric final reaction products obtained from the epoxide resins of this invention are characterized by hardness, toughness, flexibility, and outstanding chemical properties such as resistance to oxidation, water, alkali, and organic solvents. They also possess unusually good adhesion for most surfaces including metal, glass, wood, and plastic surfaces, these adhesive properties accounting to a large extent for the utility of these materials in the manufacture of adhesives and protective coatings.

The following examples will serve to illustrate the invention, however, it should be understood that the invention is not intended to be limited thereby. Proportions expressed are parts by weight unless otherwise indicated. Acid values, as used herein represent the number of milligrams of KOH required to neutralize a one gram sample.

Examples I through IV illustrate the preparation of polyepoxide compositions such as may be used in the production of the resinous epoxides of this invention.

*Example I*

In a 3-neck flask provided with a thermometer, mechanical agitation, and a reflux condenser attached through a water trap was placed a mixture of 3 mols of tetrahydrophthalic anhydride and 2 mols of n-butanol. After melting the tetrahydrophthalic anhydride in the presence of the butanol, 2 mols of ethylene glycol were added. The reaction mixture was gradually heated with agitation to 225° C. at which point a sufficient amount of xylene was added to give refluxing at esterification temperature. The reaction mixture was then heated with continuous agitation at 225–235° C. until the acid value had decreased to 4.2, a period of about 24 hours. The polyester product was a viscous, tacky material having an iodine value of 128.

A dehydrated acid form of a cation exchange resin (Dowex 50X-8, 50–100 mesh, Dow Chemical Company, a sulfonated styrene divinylbenzene copolymer containing 8% divinylbenzene) was prepared by washing the resin several times with 4 to 6 normal hydrochloric acid, washing the neutralized resin with distilled water to remove excess acid and inorganic salt, and drying the product in a vacuum oven at a temperature of about 80° C. for a period of approximately 16 hours.

In a 3-neck flask provided with a thermometer, a mechanical agitator, and a reflux condenser was placed 107 parts of the dehydrated acid form of a cation exchange resin and 30 parts glacial acetic acid. The mixture of cation exchange resin and acetic acid was allowed to stand until the resin had completely taken up the acid.

To this mixture was added 200 parts nonvolatile content of the polyester dissolved in an equal weight of xylene. To the continuously agitated reaction mixture was added dropwise over a period of 45 minutes to 1 hour 75 parts of 50% hydrogen peroxide. The reaction temperature was held at 60° C. requiring the application of some external heat. In some preparations involving other polyester resins, sufficient exothermic heat is produced during the addition of hydrogen peroxide so that no external heat is required, or even some external cooling may be required. The reaction was continued at 60° C. until a milliliter sample of the reaction mixture analyzed less than 1 milliliter of 0.1 N sodium thiosulfate in an iodometric determination of hydrogen peroxide. The product was then filtered, finally pressing the cation exchange resin filter cake. The acid value of the total resin solution was 42. The percent nonvolatile of this solution, amounting to 400 parts, was 50.

A dehydrated basic form of salt-splitting anion exchange resin (Dowex 1, Dow Chemical Company, a quaternary ammonium salt of an aminated styrene divinylbenzene copolymer of 20–50 mesh containing about 8% divinylbenzene) was prepared by washing the exchange resin several times with alkali, washing the neutralized resin with distilled water to remove excess alkali and inorganic salt, and drying the product in a vacuum oven at a temperature of about 80° C. for a period of approximately 16 hours.

The 400 parts of solution was thoroughly mixed with 110 parts of the dehydrated basic form of anion exchange resin. The resulting mixture was then filtered followed by pressing as much of the solution as possible from the anion exchange resin cake. This product had an acid value of 4.5 on the nonvolatile resin content. The epoxide equivalent (equivalent weight to epoxide group) was 288 on the nonvolatile resin content. The nonvolatile content amounted to 42.0%.

The epoxide values as used herein were determined by refluxing for 30 minutes a 2-gram sample with 50 milliliters of pyridine hydrochloride in excess pyridine. The pyridine hydrochloride solution was prepared by adding 20 milliliters of concentrated HCl to liter of pyridine. After cooling to room temperature, the sample is then back-titrated with standard alcoholic sodium hydroxide.

*Example II*

As in Example I, a polyester resin was prepared from 5 mols of tetrahydrophthalic anhydride, 4 mols of diethylene glycol, and 2 mols of n-butanol. The mixture was esterified to an acid value of 5.3, the product having an iodine value of 107. 238 parts nonvolatile of this polyester resin was epoxidized, and subsequently purified, as in Example I to give a product having an epoxide equivalent of 371 on the nonvolatile content and an acid value of 5.0 on the nonvolatile content. The nonvolatile content of this resin solution as prepared was 40.2%.

*Example III*

As in Example I, a polyester resin was prepared from 1.1 mols of tetrahydrophthalic anhydride, 1 mol of 1,4-butanediol, and 0.2 mol of n-butanol. The mixture was esterified to an acid value of 8.6, the product having an iodine value of 93. 273 parts nonvolatile of this polyester resin was epoxidized and subsequently purified as in Example I to give a product having an epoxide equivalent of 292 and an acid value of 10.7 on the nonvolatile content. The nonvolatile content of this resin solution as prepared was 41.9%.

*Example IV*

In a reaction vessel provided with a mechanical stirrer and external cooling means was placed 276 parts of glycerol and 828 parts of epichlorohydrin. To this reaction mixture was added 1 part 45% boron trifluoride ether solution diluted with 9 parts of ether. The reaction mixture was agitated continuously. The temperature rose to 50° C. over a period of one hour and 45 minutes, at which time external cooling with ice water was applied. The temperature was held between 50 and 75° C. for 1 hour and 20 minutes.

To 370 parts of this product in a reaction vessel provided with a mechanical agitator and a reflux condenser was added 900 parts of dioxane and 300 parts of powdered sodium aluminate. With continuous agitation, this reaction mixture was gradually heated to 92° C. over a period of 1 hour and 50 minutes, and held at this temperature for 8 hours and 50 minutes. After cooling to room temperature, the inorganic material was removed by filtration. The dioxane and low boiling products were removed by heating the filtrate to 205° C. at 20 millimeters pressure, to yield 260 parts of a pale yellow product. The epoxide equivalent on this product was found to be 152. The average molecular weight of the product was 324.

The average molecular weight was obtained by standard freezing point depression method with benzophenone.

In the examples to follow, the polyepoxide compositions employed in preparing the novel epoxide resins of this invention include the epoxide resins designated below as epoxides A through I, respectively.

Epoxide A: An epoxidized soyabean oil obtained commercially from the Archer-Daniels-Midland Company as Admex 710 having an epoxide equivalent of 263. The specifications for this material are: acid value, 1.0; color (Gardner), 1–2; viscosity at 25° C., 3.3 stokes; specific gravity at 25° C., 0.9903; refractive index, 1.47142; average molecular weight, 937.

Epoxide B: An epoxidized vegetable oil similar to Admex 710 obtained commercially from the Archer-Daniels-Midland Company as Admex 711. The epoxide material has an epoxide equivalent of 274. Other physical values for the material are: acid value, 1.0; average molecular weight, approximately 930.

Epoxide C: Vinylcyclohexene diepoxide. A commercial grade having an epoxide equivalent of 72.

Epoxide D: Butadiene diepoxide. A commercial grade having an epoxide equivalent of 45 was employed.

Epoxides E through I are listed in the following table. These epoxides are prepared by the reaction of bis(4-hydroxyphenyl) dimethyl methane with molar excesses of epichlorohydrin in varying amounts, and are marketed by Shell Chemical Corporation as Epon resins. The average molecular weights were determined by the standard boiling point elevation method.

| Epoxide | Epon Resin Type | Melting Point °C. | Viscosity [1] (Gardner-Holdt) | Epoxide Equivalent | Average Molecular Weight |
|---|---|---|---|---|---|
| E | Epon 864 | 40–45 | A--B | 325 | 450 |
| F | Epon 1001 | 64–76 | C--G | 480 | 640 |
| G | Epon 1004 | 95–105 | Q--U | 870 | 1,133 |
| H | Epon 1007 | 127–133 | Y--Z¹ | 1,750 | |
| I | Epon 1009 | 145–155 | Z₂--Z₅ | 3,200 | |

[1] On 40% nonvolatile in butyl carbitol at 25° C.

Examples V through VII illustrate the preparation of mono alkali metal salts of a diaryloxy acid, these carboxylate derivatives being employed in the preparation of the resinous epoxides of this invention.

*Example V*

*Procedure (a).*—954 parts of 4,4-bis(4-hydroxyphenyl) pentanoic acid was slowly added with stirring to a solution of 134 parts of sodium hydroxide in 5000 parts of water. After all the reactants had been added and a complete solution was obtained, 4250 parts of water was removed by evaporation using a partial vacuum of about 70–80 millimeters. The paste-like residue was further warmed in a vacuum oven (at a pressure of 70–80 millimeters) for 16 hours at 140–150° C. When titrated with standard aqueous HCl, one gram of the dry carboxylate derivative of the acid was found to be equivalent to 120.2 milligrams of HCl (theoretical value is 118.3).

*Procedure (b).*—A methanoic sodium hydroxide solution was prepared by dissolving 88 parts of sodium hydroxide in 1000 parts of methanol and removing any sodium carbonate impurities formed by filtering the solution through diatomaceous earth. This solution was added with stirring to a solution of 573 parts of 4,4-bis(4-hydroxyphenyl) pentanoic acid in 1000 parts of methanol, and the stirring continued until a pH of 10 was obtained. The resulting solution was evaporated and dried as in procedure (a) above, to yield a dry, solid salt. One gram of this product was equivalent to 116.9 milligrams of HCl.

*Example VI*

A slurry of 36.9 parts of lithium carbonate in 1000 parts of water was prepared. The slurry was warmed to 75° C., and while held at this temperature 286.3 parts of 4,4-bis(4-hydroxyphenyl) pentanoic acid was slowly added with stirring over a period of about 1½ hours. Carbon dioxide evolved freely as the latter part of the acid was added. After all the acid had been added and complete solution obtained, 700 parts of water were removed by evaporation as in Example V, and the product dried in a vacuum oven for 16 hours at 120° C. 202 parts of dried product was obtained. One gram of this product was equivalent to 123.4 milligrams of HCl (theoretical value is 124.8 milligrams).

*Example VII*

A solution of 56.1 parts of potassium hydroxide in 1000 parts of water was prepared. 286.3 parts of 4,4-bis(4-hydroxyphenyl) pentanoic acid was added slowly with stirring to this solution. When complete solution was obtained, 615 parts of water were removed by evaporation as in Example V, and the product dried in a vacuum oven for 6 hours at 130° C. 248 parts of product were obtained, one gram of the product being equivalent to 102.1 milligrams of HCl (theoretical value is 112.4 milligrams).

Examples VIII through XI illustrate the preparation of the resinous epoxides of this invention using the polyepoxide prepared in Example IV.

*Example VIII*

In a suitable flask equipped with a mechanical stirrer, thermometer, and reflux condenser was placed 154 parts of the sodium 4,4-bis(4-hydroxyphenyl) pentanoate, 456 parts of dimethyl sulfoxide, and 302 parts of the polyepoxide of Example IV. With agitation, the reactants were heated in a water bath at 80° C. for 1 hour, and then cooled to room temperature.

In order to regenerate the carboxyl groups of the epoxide material obtained, the resulting carboxylate mixture was treated using the following techniques.

(a) A dehydrated acid form of Dowex 50X–8 was prepared as in Example I. This resin on a dehydrated basis has an exchange equivalent of 5 mil equivalents of cation per gram of dehydrated resin. To 300 parts of the carboxylate mixture was added 33 parts of dehydrated resin, or about 1½ times the amount necessary to theoretically acidify the carboxylate content of the mixture. The mixture was stirred for 3 hours, and the exchange resin then filtered from the mixture after which the exchange resin was washed with neutral dioxane to remove the last traces of acidified product from the resin. The nonvolatile content of the resulting product was adjusted to about 35% using dioxane. The neutralization equivalent of the product (grams of product containing a gram equivalent of carboxyl groups), determined by titrating the product with cold aqueous sodium hydroxide, was 1798. The epoxide equivalent of the product was 494. The epoxide equivalents and neutralization equivalents used herein are based on nonvolatile content.

(b) A cool solution (about 20° C.) of 300 parts of the carboxylate mixture in six times as many parts of water was slowly mixed with acetic acid until the pH of the solution was reduced to 4.5 (about 30 parts of acetic acid). The addition of the acid caused precipitation of a resinous product. The liquid portion was decanted, and the resinous product washed several times with distilled water until free of water soluble acid. The product was then taken up in neutralized dioxane to a nonvolatile content of about 30%. The product had an epoxide equivalent of 597, and a neutralization equivalent of 1461.

(c) A cool solution (about 20° C.) of 235 parts of the carboxylate mixture in one half as many parts of neutral dioxane was slowly mixed with 6.13 N methanoic HCl until the pH of the solution was reduced to 7 (about 35 parts of acid solution). The salt precipitate formed was removed, and the resulting solution had a nonvolatile content of 34.2%, an epoxide equivalent of 501, and a neutralization equivalent of 4250.

*Example IX*

Using the procedure of Example VIII, a mixture of 228 parts of xylene, 228 parts of ethanol, 154 parts of sodium 4,4-bis(4-hydroxyphenyl) pentanoate, and 302 parts of the polyepoxide of Example IV was heated at 80° C. for an hour and a half, a homogeneous solution appearing at the end of about 35 minutes. After cooling, a precipitate of 422 parts of a resinous carboxylate product having a nonvolatile content of 60.8% was collected. The precipitate was converted to an acid and dissolved in dioxane using the procedure of Example VIII(b).

This product had an epoxide equivalent of 2860 and a neutralization equivalent of 928.

Example X

Using the procedure of Example VIII, a mixture of 146 parts of lithium 4,4-bis(4-hydroxyphenyl) pentanoate, 373 parts of dimethyl sulfoxide, and 227 parts of the polyepoxide of Example IV was heated for 85 minutes at 80° C., then cooled to room temperature. The product was converted to an acid using the procedure of Example VIII(b). This product had an epoxide equivalent of 693 and a neutralization equivalent of 1310.

Example XI

Using the procedure of Example VIII, a mixture of 162 parts of potassium 4,4-bis(4-hydroxyphenyl) pentanoate, 389 parts of dimethyl sulfoxide, and 227 parts of the polyepoxide of Example IV was heated for 30 minutes at 80° C., then cooled to room temperature. The carboxylate product was converted to an acid using the method of Example VIII(a). The product had an epoxide equivalent of 650 and a neutralization equivalent of 1931. The carboxylate product was then converted to an acid using the method of Example VIII(b), to yield a product having an epoxide equivalent of 708 and a neutralization equivalent of 2130.

Examples XII through XXXVI, tabulated below, illustrate the preparation of a number of the resinous epoxide compositions of this invention, and the conversion of these epoxide materials to insoluble, infusible films by the application of heat. In general, the procedure followed in the examples comprised preparing a mixture of a polyepoxide, a diaryloxy acid salt, and a solvent, the particular material employed and the proportions used being listed for each example. The quantities referred to in the table are parts by weight based on nonvolatile content. These were then heated as in Example VIII for the time and at the temperature indicated in the table. The carboxylate derivative of the resinous epoxides of this invention were then converted to acid form using the procedures set forth in Example VIII under (a), (b), and/or (c), as shown in the table.

Also indicated in the table are the epoxide equivalent and neutralization equivalent found for each resinous epoxide obtained.

Wet films of about .002" thickness were prepared from these epoxide compositions by spreading the compositions on glass panels. These films were then subjected to heat, and converted thereby to flexible, infusible products which were tack free even at the temperatures used for conversion. The time and temperature used in converting the films is set forth in the table below. The films generally were hard as well as flexible, and showed a marked degree of adhesion to the glass panels upon which they had been cured as they could be scraped from the panels only with difficulty.

The films also displayed a high degree of chemical resistance to such materials as organic solvents, water, and alkali. The table lists for each example the length of time the films withstood submersion, without deterioration, in boiling water and 5% aqueous sodium hydroxide.

TABLE

| Example Number | Reaction Ingredients | | | Acid Regeneration | | |
|---|---|---|---|---|---|---|
| | Parts Epoxide | Parts Diaryloxy Salt [1] | Parts Solvent | Time (hr.) | Temp., ° C. | Procedure of Example VIII Employed In Regeneration |
| XII | 341, Epoxide E | 154 | 495, Dimethyl Sulfoxide. | 1 | 80 | a. b. |
| XIII | 140, Epoxide E | 30.8 | 170.8, Dimethyl Sulfoxide. | 1 | 80 | a. b. c. [2] b. |
| XIV | 512, Epoxide E | 154 | 666, Dimethyl Sulfoxide. | 1 | 80 | a. b. |
| XV | 1,132, Epoxide F | 154 | 1,236, Dimethyl Sulfoxide. | 1 | 80 | a. b. |
| XVI | 510, Epoxide F | 92 | 602, Dimethyl Sulfoxide. | 1.3 | 80 | a. |
| XVII | 1,855, Epoxide G | 154 | 2,009, Dimethyl Sulfoxide. | 1 | 80 | b. |
| XVIII | 278, Epoxide G | 31 | 309, Dimethyl Sulfoxide. | 1.9 | 80 | a. b. |
| XIX | 500, Epoxide H | 39 | 539, Dimethyl Sulfoxide. | 1 | 80 | a. b. |
| XX | 600, Epoxide H | 31 | 631, Dimethyl Sulfoxide. | 1 | 80 | a. b. |
| XXI | 898, Epoxide I | 77 | 1,950, Dimethyl Sulfoxide. | 1 | 80 | a. b. |
| XXII | 241, Example III | 62 | 303, Dimethyl Sulfoxide. | 1.25 | 90 | a. b. |
| XXIII | 173, Example I | 46 | 219, Dimethyl Sulfoxide. | 1 | 100 | a. b. |
| XXIV | 437, Example I | 154 | 591, Dimethyl Sulfoxide. | 1 | 100 | a. b. |
| XXV | 309, Example II | 77 | 386, Dimethyl Sulfoxide. | 0.8 | 100 | a. b. |
| XXVI | 298, Example II | 92 | 390, Dimethyl Sulfoxide. | 0.6 | 100 | a. b. |
| XXVII | 275, Epoxide A | 77 | 352, Dimethyl Sulfoxide. | 1 | 150 | a. b. |
| XXVIII | 412, Epoxide A | 154 | 566, Dimethyl Sulfoxide. | 1 | 150 | a. b. |
| XXIX | 274, Epoxide B | 77 | 351, Dimethyl Sulfoxide. | 1.2 | 150 | a. b. |
| XXX | 329, Epoxide B | 123 | 452, Dimethyl Sulfoxide. | 1.5 | 150 | a. |
| XXXI | 302, Example IV | 154 | 456, Dioxane. | 0.83 | 80 | b. |
| XXXII | 227, Example IV | 154 | 381, Dioxane. | 0.83 | 80 | a. b. |
| XXXIII | 143, Epoxide C | 154 | 287, Dioxane. | 0.5 | 100 | a. b. |
| XXXIV | 129, Epoxide C | 185 | 314, Dioxane. | 0.75 | 150 | a. |
| XXXV | 180, Epoxide D | 308 | 488, Dioxane. | 1 | 55 | b. |
| XXXVI | 135, Epoxide D | 308 | 443, Dioxane. | 1.08 | 50 | a. b. |

[1] Sodium 4,4-bis(4-hydroxyphenyl) pentanoate.  [2] (Substituting oxalic for acetic.)

| Example Number | Properties of Product | | Conversion to Infusible Product | | | |
|---|---|---|---|---|---|---|
| | | | Bake | | Film Resistance | |
| | Neutralization Equivalent | Epoxide Equivalent | Time (hr.) | Temp., °C. | Boiling H₂O (hr.) | 5% NaOH at 25° C. |
| XII | 1,539 | 2,493 | 0.5 | 200 | 23 | 8 |
| | 1,172 | 1,226 | 0.5 | 175 | 79 | 79 |
| | 2,093 | 1,141 | 0.5 | 150 | 56 | 31 |
| XIII | 3,066 | 1,097 | 0.5 | 175 | 39 | 104 |
| | 2,397 | 1,153 | 0.5 | 175 | 9 | 86 |
| | 1,058 | 1,166 | 0.5 | 200 | 16 | 31 |
| XIV | 2,036 | 1,678 | 0.5 | 175 | 79 | 46 |
| | 1,710 | 1,619 | 0.5 | 175 | 79 | 79 |
| XV | 3,480 | 1,109 | 0.5 | 175 | 24 | 117 |
| XVI | 3,275 | 1,123 | 0.5 | 200 | 24 | 88 |
| XVII | 2,705 | 1,874 | 0.5 | 200 | 11 | 12 |
| | 4,218 | 1,838 | 0.5 | 200 | 6 | 88 |
| XVIII | 3,945 | 4,284 | 0.5 | 200 | 23 | 23 |
| | 2,120 | 1,731 | 0.5 | 150 | 23 | 23 |
| XIX | 9,122 | 2,529 | 0.5 | 150 | 8 | 8 |
| | 4,811 | 2,873 | 0.5 | 150 | 2 | 8 |
| XX | 5,164 | 2,274 | 0.5 | 200 | 9 | 28 |
| | 5,723 | 3,558 | 0.5 | 175 | 3 | 7 |
| XXI | 3,310 | 4,668 | 0.5 | 150 | 8 | 8 |
| | 5,724 | 5,552 | 0.5 | 175 | 8 | 11 |
| XXII | 2,003 | 624 | 0.5 | 200 | 10 | 2 |
| | 1,594 | 551 | 1.0 | 175 | 24 | 3 |
| XXIII | 1,146 | 1,152 | 0.5 | 175 | 16 | 1 |
| | 1,573 | 946 | 0.5 | 175 | 16 | 2 |
| XXIV | 1,336 | 835 | 0.5 | 200 | 8 | 1 |
| | 1,359 | 514 | 0.5 | 200 | 1 | 3 |
| XXV | 1,345 | 643 | 0.5 | 200 | 3 | 0.1 |
| | 1,615 | 541 | 0.5 | 200 | 5 | 17 |
| XXVI | 1,475 | 795 | 0.5 | 200 | 12 | 5 |
| | 946 | 661 | 0.5 | 150/175 | 4 | 4 |
| XXVII | 1,463 | 699 | 0.5 | 200 | 3 | 17 |
| | 2,363 | 1,086 | 0.5 | 200 | 3 | 26 |
| XXVIII | 1,335 | 835 | 0.5 | 200 | 8 | 1 |
| | 1,359 | 514 | 0.5 | 200 | 1 | 3 |
| XXIX | 1,596 | 674 | 0.5 | 200 | 3 | 17 |
| | 1,298 | 522 | 0.5 | 200 | 3 | 17 |
| XXX | 1,326 | 903 | 0.5 | 200 | 5 | 1 |
| XXXI | 682 | 519 | 0.5 | 175 | 16 | 1 |
| XXXII | 1,238 | 928 | 0.5 | 200 | 3 | 1 |
| | 924 | 799 | 0.5 | 200 | 3 | 1 |
| XXXIII | 595 | 745 | 0.5 | 175 | 9 | 2 |
| | 554 | 1,196 | 0.5 | 200 | 8 | 1 |
| XXXIV | 472 | 3,222 | 0.5 | 200 | 16 | 4 |
| XXXV | 1,232 | 1,797 | 0.5 | 150 | 5 | 0.1 |
| XXXVI | 452 | 791 | 0.5 | 175 | 16 | 0.1 |
| | 758 | 897 | 0.5 | 150 | 5 | 0.1 |

The resinous epoxides, before conversion to insoluble, infusible products, were quite stable, and solutions of these epoxides could be left standing over relatively long periods of time without showing substantial increases in viscosity. However, because of the carboxyl content of the materials, they could be converted readily to complex products without the addition of an acid converting agent by the application of heat. The ease with which the epoxide materials may be stored, and then converted to polymeric reaction products merely by the application of heat contribute a great deal to their usefulness in the production of a wide variety of materials.

While various embodiments of this invention have been described, it should be understood that the invention is not restricted thereto, and that it is intended to cover all modifications of the invention which would be apparent to one skilled in the art and that come within the scope of the appended claims.

It is claimed and desired to secure by Letters Patent:

1. Heat hardenable compositions of matter containing oxirane and carboxyl groups; said compositions being ethers having aliphatic chains alternating with and connected by ether oxygen to residues of a pentanoic acid obtained by the removal of the phenolic hydroxyl, said pentanoic acid consisting essentially of 4,4 bis(4-hydroxyaryl)pentanoic acid wherein the hydroxyaryl radical is hydroxyphenyl and is free from substituents other than alkyl groups of from 1–5 carbon atoms, said aliphatic chains being free from active hydrogen containing groups other than alcoholic hydroxyl groups; the compositions having terminal aliphatic chains attached to the residues of the pentanoic acid through ether oxygen, said terminal aliphatic chains containing oxirane groups.

2. The composition of claim 1 wherein the pentanoic acid consists essentially of 4,4 bis(4-hydroxyaryl) pentanoic acid wherein the hydroxyaryl radical is a hydroxyphenyl radical and is free from substituents other than alkyl groups of one carbon atom.

3. The composition of claim 1 wherein the pentanoic acid is 4,4 bis(4-hydroxyphenyl) pentanoic acid.

4. The process of preparing heat hardenable compositions containing oxirane and carboxyl groups which comprises heating a reaction mixture containing a salt of a member of the group consisting of alkaline earth and alkali metals and a pentanoic acid and a polyoxirane, said pentanoic acid consisting essentially of a 4,4 bis(4-hydroxyaryl)pentanoic acid wherein the hydroxyaryl radical is a hydroxyphenyl radical and is free from substituents other than alkyl groups of from 1–5 carbon atoms, and said polyoxirane contains more than one oxirane group and is free from active hydrogen containing groups other than alcoholic hydroxyl groups, the reaction of the oxirane groups of the polyoxirane with the aryl hydroxyl groups of said pentanoic acid forming ether linkages and alcoholic hydroxyl groups; the ratio of the aryl hydroxyl group to oxirane groups not exceeding about 2:1 in the mixture, terminating the reaction of aryl hydroxyl groups with oxirane groups before the ratio of carboxylate groups to oxirane groups in the mixture exceeds about 4:1, and converting the carboxylate groups of the product to carboxyl groups by ion exchange with an acid.

5. The process of claim 4 wherein the reaction mixture is dissolved in an alkali inert organic solvent having a kauri-butanol solvency of greater than about 85.

6. The process of claim 5 wherein the metal salt of the pentanoic acid is the salt of an alkali metal selected from the group consisting of sodium, potassium, and lithium.

7. The process of claim 5 wherein the number of oxirane groups in the reaction mixture is in excess of the aryl hydroxyl groups.

8. The process of claim 6 wherein the solvent is dimethyl sulfoxide.

9. A composition of matter having the general formula

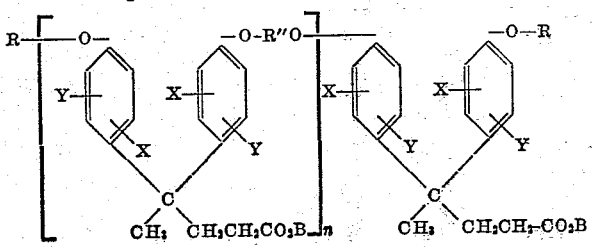

wherein R is an aliphatic monovalent radical free from active hydrogen containing substituents other than hydroxyl groups with the combined R's having an average of more than about one oxirane group; R" is an aliphatic divalent radical free from active hydrogen containing substituents other than alcoholic hydroxyl groups; B is a member of the group consisting of hydrogen, alkali metals and alkaline earth metals in order to form a member of the group consisting of the acid and acid salt, X and Y are members of the group selected from hydrogen and alkyl groups of from 1-5 carbon atoms, and $n$ has a value of 1-15.

References Cited in the file of this patent
UNITED STATES PATENTS
2,768,153    Shokal _____ Oct. 23, 1956

UNITED STATES PATENT OFFICE
CERTIFICATE OF CORRECTION

Patent No. 2,933,471                          April 19, 1960

Sylvan O. Greenlee

It is hereby certified that error appears in the printed specification of the above numbered patent requiring correction and that the said Letters Patent should read as corrected below.

Columns 1 and 2, the formula enclosed by the first large brackets, the lower portion thereof should appear as shown below instead of as in the patent:

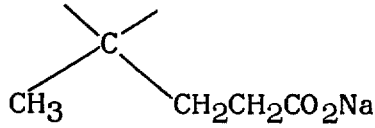

column 4, line 54, for "salt" read -- salts --; column 5, line 26, for "reactions" read -- reaction --; column 6, line 6, for "lingages" read -- linkages --; line 18, for "ployester" read -- polyester --.

Signed and sealed this 18th day of October 1960.

(SEAL)
Attest:

KARL H. AXLINE                                        ROBERT C. WATSON
Attesting Officer                                Commissioner of Patents